Jan. 21, 1941.  E. W. CARROLL ET AL  2,229,168
METHOD FOR DICING FRUIT
Filed Sept. 27, 1939  2 Sheets-Sheet 1

ELLSWORTH W. CARROLL.
CHARLES LACHMAN.
PAUL WORMSER.
INVENTORS.

BY Lippincott & Metcalf
ATTORNEYS.

Jan. 21, 1941.  E. W. CARROLL ET AL  2,229,168

METHOD FOR DICING FRUIT

Filed Sept. 27, 1939   2 Sheets—Sheet 2

ELLSWORTH W. CARROLL.
CHARLES LACHMAN.
PAUL WORMSER.
INVENTORS,

BY Lippincott & Metcalf
ATTORNEYS.

Patented Jan. 21, 1941

2,229,168

UNITED STATES PATENT OFFICE 2,229,168

METHOD FOR DICING FRUIT

Ellsworth W. Carroll, Charles Lachman, and Paul Wormser, San Francisco, Calif., assignors to S & W Fine Foods, Inc., San Francisco, Calif., a corporation of California Application September 27, 1939, Serial No. 296,788

17 Claims. (Cl. 146—219)

Our invention relates to a means and method for dicing fruit, and more particularly to a means and method for dicing fruit mechanically to produce a uniform product with a minimum of waste. Our invention is particularly applicable to the dicing of peaches, apples, pears, or other fruits having a pit or unwanted core material.

Among the objects of our invention are: To provide a means and method for automatically, mechanically and continuously dicing fruit; to provide a mechanical dicer for peaches, apples, pears, and the like; to provide a means and method for mechanically dicing fruit with a minimum of waste; to provide a means and method for dicing and coring a fruit simultaneously; to provide a means and method of mechanically coring fruit simultaneously with a dicing operation; to provide a means and method of eliminating hand dicing of fruit; and to provide a simple, mechanical device for dicing whole fruit which may be either continuously and automatically operated or hand operated to produce a uniform product at a low cost.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Broadly as to method, our invention comprises alining the fruit preferably with the long axis of the core or pit thereof vertical, and then cutting off the top and bottom of the fruit along horizontal planes. In some cases useful meat will be contained in the cut-off top and bottom portions, and in which case such useful meat is diced and delivered to be mixed with other useful fruit portions. If no good meat is present in the top and bottom portions then the removed top and bottom portions may be discarded. The center section is cut in parallel horizontal planes into unwanted core material, and finally vertical cuts are made to separate core from outside meat and to dice or segment the outside meat previously horizontally cut.

Broadly as to apparatus, our invention comprises means for supporting a fruit with the core in a predetermined position, preferably with its major axis vertical, and then knives are provided entering the top and bottom of the fruit. Top and bottom knives are rotatable to rotate the fruit, and lateral knives are then forced into the fruit to make parallel cuts therein surrounding but not entering the core, certain of these knives severing top and bottom portions of the fruit from a central portion. Means are provided to remove the center section of the fruit from the cut-off end portions and to deposit the fruit on a combined coring and dicing knife. A mandrel or piston is then positioned above the center section of the device, movable downwardly to force the center section of the fruit through the combined dicing and coring knife to simultaneously dice the horizontally cut meat and separate the core therefrom. Separate means are provided to catch and segregate core material from diced meat. Means are also provided in certain cases to remove and save meat from the end knives.

Our invention may be more fully understood by direct reference to the drawings, showing a peach dicing machine wherein the fruit to be operated upon is indicated by broken lines throughout. All figures are diagrammatic and schematic, and have been drawn with the motional power transmission elements omitted for clarity of illustration of the method.

Motion and direction of motion of apparatus parts and peach slices are indicated by arrows throughout the drawings.

Figure 1:
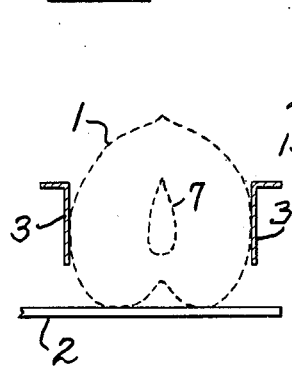
Fig. 1 is a diagram showing the peach held in position for the beginning of the dicing operation.

Referring directly to Fig. 1, a peach, which is used herein purely as an illustration of a fruit to be diced, is indicated by broken line 1 throughout. The peach is picked up from a foundation member 2 by clamp arms 3—3 and held by these arms for transport. Peach 1 may well be positioned on foundation member 2 by hand, with the stem indent down, or if desired it may be orientated and transported to the same position by an automatic machine such as, for example, the machine shown, described and claimed in a prior application of Ellsworth W. Carroll for United States letters patent entitled "Full automatic orientator," Serial No. 211,140, filed June 1, 1938.

Figure 2:
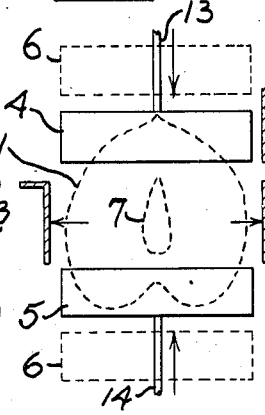
Fig. 2 is a diagram showing the first step in the dicing operation, namely, the dicing of the top and bottom of the fruit.

The peach is then transported or moved in any convenient manner by means of the clamp arms 3—3 to a position between two end knives, an upper end knife 4 and a lower end knife 5. These end knives are movable from a spread position, as indicated by broken lines 6 in Fig. 2, toward each other to enter the top and bottom of the peach nearly to the ends of the vertical pit 7 of the fruit or to the ends of the unwanted core material if no pit is present.

Figure 7:
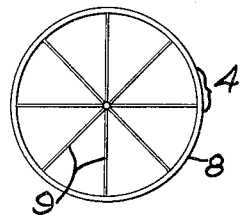
Fig. 7 is a plan view of the top end knife used in the device shown in Fig. 2.
Figure 8:
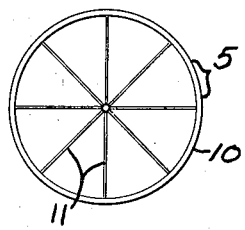
Fig. 8 is a plan view of the bottom end knife utilized in the device of Fig. 2.

Upper end knife 4 comprises a rim 8 joined by diametrical cutting blades 9, as shown in Fig. 7 in plan view. Lower end knife 5 is practically identical with upper end knife 4, with a similar rim 10 and diametrical cutting knives 11. Upper end knife 4 is supported by shaft 13 and lower end knife 5 is supported by shaft 14, both shafts being alined and coaxial. After end knives 4 and 5 have cut into the top and bottom of the fruit, clamp arms 3—3 are moved outwardly and away from the fruit, leaving the fruit supported solely by end knives 4 and 5. The fruit is now ready for the next step in the process which comprises the rotation of the fruit 1 by rotation of end knives 4 and 5 on alined shafts 13 and 14.

While the fruit is rotating, an assembly of horizontal circular and parallel knives 16, mounted on a circular knife shaft 17, are moved in from one side of the fruit and forced against the side of the fruit. Knives 16 are also rotated by rotation of shaft 17 to make horizontal parallel cuts 18 in the fruit into the unwanted core material including, in the peach, the pit.

Figure 3:
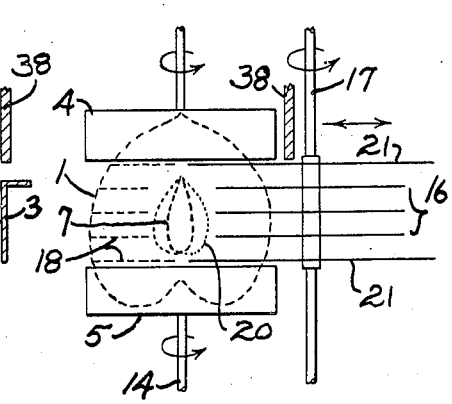
Fig. 3 is a diagram showing the second operation, namely, the forming of horizontal cuts.

It is to be noticed in this regard that the pit is not round but oval, and in Fig. 3, illustrating the third step, two sections of the pit are shown, a heavy line section 7, as in the previous figures, and a light line section 20 of greater extent, this section 20 being the elevation of the widest diameter of the pit. This section 20 determines the depth to which knives 16 may cut.

Figure 4:
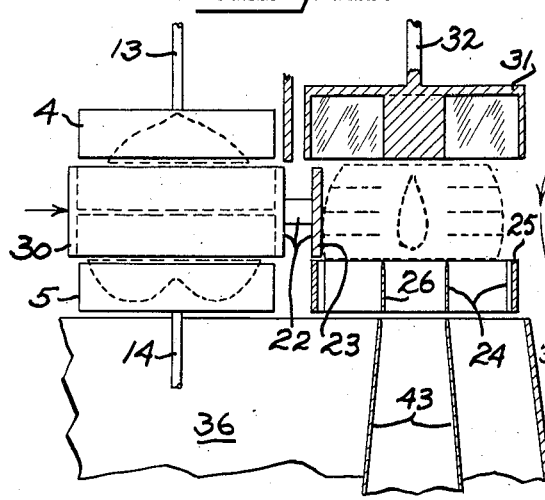
Fig. 4 is a diagram showing a portion of the apparatus in section, illustrating the third step in the process, namely, the removal of the center section of the fruit.

Of the circular knife assembly 16, top and bottom blades 21 are preferably of greater diameter than the remainder of the knives so that the cuts at top and bottom, directly beneath and above end knives 5 and 4 respectively, sever the portions of the peach within the top and bottom knives from the remainder of the peach after a complete revolution of the peach. Rotation of the peach and circular knives 16 and 21 then ceases, and the circular knives 16 and 21 are withdrawn laterally, leaving the peach ready for the next operation shown in Fig. 4. Thus, we have severed top and bottom from the center section of the peach. In this regard, many fruits may have no good meat in top and bottom pieces, and therefore these top and bottom pieces may be discarded. In this case, operation up to this point will serve only to prepare the fruit for further operations.

Figure 9:
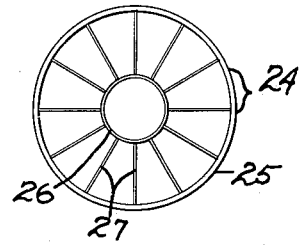
Fig. 9 is a plan view of the horizontal coring and dicing knife utilized in Figs. 4, 5 and 6.
Figure 10:
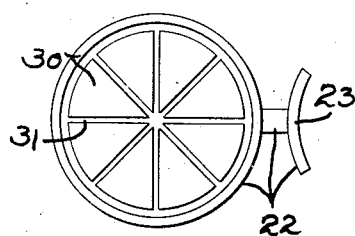
Fig. 10 is a plan view of the end-knife mandrel utilized in Figs. 4, 5 and 6.
Figure 12:
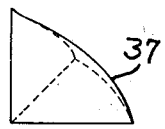
Fig. 12 is a perspective view of a top peach slice.
Figure 15:
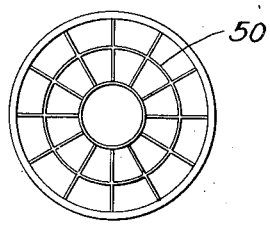
Fig. 15 is a plan view of a modification of the dicing and coring knife.

A plunger assembly 22 is then moved in from one side of the peach, preferably the side opposite knives 16, this plunger assembly having a leading plunger plate 23 engaging the side of the fruit to force the center section of the fruit out of the space it formerly occupied, pushing this central portion of the peach onto a horizontal coring and dicing knife 24, a plan view of this knife and its lateral position being shown in Fig. 9. Knife 24 has a rim 25, a central circular blade 26 large enough to encompass the pit and unwanted core material, and radial blades 27 joining the central circular blade with the rim 25. Obviously the radial arrangement of blades 27 may be changed to any outwardly extending arrangement if change in shape of diced pieces is desired. Or, if the fruit is wide an additional circular blade 50 may be used, as shown in Fig. 15.

Figure 11:
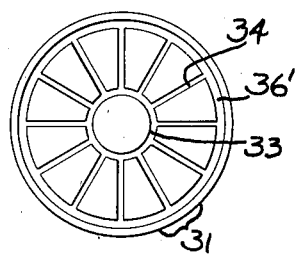
Fig. 11 is a plan view of the coring mandrel utilized in Figs. 4, 5 and 6.
Figure 13:
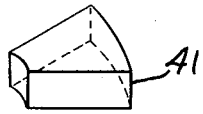
Fig. 13 is a perspective view of a central peach slice.

Plunger assembly 22 also includes an end knife mandrel 30, this end knife mandrel having on top and bottom thereof, diametrical slots 31 into which the blades of knives 4 and 5 may enter. The spacing of plunger plate 23 and mandrel 30 is so arranged that when the central portion of the peach is pushed on coring knife 24, the slots 31 in end knife mandrel 30 will be registered with the blades of end knives 4 and 5. The fruit is then ready for the final step. The central portion of the peach rests on coring knife 24 and is positioned beneath a coring mandrel 31 movable by coring mandrel shaft 32. Coring mandrel 31, shown in elevation in Fig. 11, has a central circular slot 33, radial slots 34, and a peripheral slot 36', registering with the circular blade and radial blade portions of coring knife 24.

Figure 5:
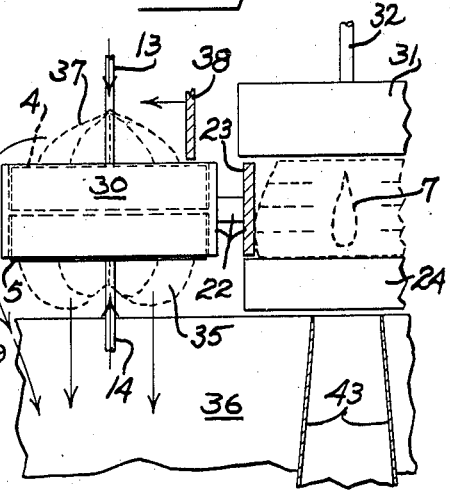
Fig. 5 is a diagram showing the next step in the method, namely, the removal of top and bottom pieces.
Figure 6:
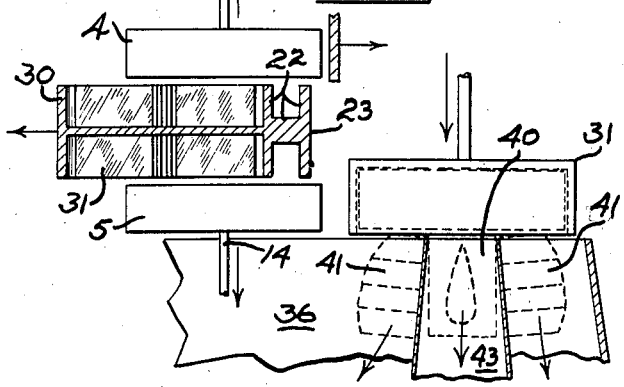
Fig. 6 is a diagram showing the next step in the process, namely, the simultaneous separation of the core from the center section, with dicing of the lateral portions of the fruit.

The next step is shown in Fig. 5. While end knife mandrel 30 is still between end knives 4 and 5, these knives are forced toward each other as shown in Fig. 5, into the mandrel both above and below, and the lower portion of end knife mandrel 30 forces lower fruit pieces 35 directly into output chute 36. Upper fruit pieces 37 are also forced out of the top of end knife 4 by the upper surface of end knife mandrel 30 from which they are scraped off by scraper 38, and moved laterally over the top of end knife mandrel 30, divided to pass by shaft 13. Thus, the top fruit pieces 37 will fall also into chute 36, as indicated by arrow line 39. Knives 4 and 5 are then withdrawn from the end knife mandrel 30, scraper 38 is moved back laterally, and plunger assembly 22 is moved away from the central portion of the peach, as shown in Fig. 6. However, if top and bottom pieces are not to be used it is obvious that these pieces may be deposited in a waste chute in the position of chute 36.

Figure 14:
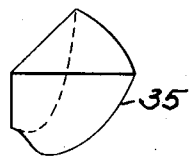
Fig. 14 is a perspective view of a bottom peach slice.

The next operation is the descent of coring and dicing mandrel 31, forcing the central portion of the peach against coring knife 24 and pushing the central portion of the peach therethrough. Circular coring blade 26 cuts out the core 40 of the peach and radial blades 27 make radial cuts along vertical planes in the central portion of the peach which has already been horizontally cut, thus dividing the outside of the central portion of the peach into substantially uniform segmental pieces 41 shaped as shown in Fig. 14. Segmental pieces 41 fall into output chute 36, but directly beneath circular coring blade 26 we position a truncated conical coring chute 43 to receive the core and the pit. The peach has thus been completely and mechanically diced with the exception of the central core, and it will be obvious that very little valuable meat will be left around the core, particularly as the top and bottom portions of the peach have been removed before the coring and dicing operation on the central portion takes place.

Thus, we have provided a mechanical device for dicing peaches or similar fruit following certain defined steps: The removal of top and bottom of the fruit by the segmenting of all meat above and below the extent of the pit or core while the pit or core is in a vertical position and collection of the top and bottom meat, or by discard of top and bottom meat if not desirable; the making of horizontal circular cuts in the central portion of the fruit around the core; the simultaneous coring and vertical cutting of the central portion, the meat of which has already been horizontally cut; and the segregation of the diced good meat from core material.

Thus, the output of the machine may comprise two types of pieces, i. e., the wedge-shape pieces 35 and 37 from the top and bottom of the peach, and the segmental pieces 41 from the central portion of the peach, or the output may be wholly of segmental pieces from the center section. It will be obvious that the spacing of the knives can be readily so adjusted that the wedge slices can be of substantially the same general size or weight as the segmental slices, thus giving to the product a uniform and distinctive appearance.

It will also be obvious that our invention may be applied to the dicing of variously shaped fruits by varying knife design and stroke lengths, all following the teachings outlined above within the scope of the appended claims, as full equivalents.

We claim:

1. The method of dicing fruit which comprises forcing dicing knives into the top and bottom of the fruit, forcing circular knives into the fruit laterally and rotating the fruit to form parallel circular cuts, removing top and bottom cut pieces, and forcing a coring and dicing knife through the remainder of the fruit to separate the core material from the diced remainder.

2. The method of dicing fruit which comprises removing top and bottom of the fruit along planes at right angles to the long axis of the fruit core, making parallel circular cuts around the core in planes parallel to said first planes, and simultaneously coring said fruit and radially cutting the meat separated by said circular cuts.

3. The method of dicing fruit which comprises removing top and bottom of the fruit along planes at right angles to the long axis of the fruit core, making parallel circular cuts around the core in planes parallel to said first planes, and making additional cuts through the circular cut meat to separate said meat from the core.

4. The method of dicing fruit which comprises making a plurality of parallel circular cuts into the side of said fruit to form a plurality of annular cut slices centrally joined, and simultaneously dicing said slices and separating them from the central unwanted core material.

5. The method of dicing fruit which comprises forcing dicing knives into the top and bottom of the fruit, rotating said knives to rotate said fruit on an axis of the core material, forcing parallel knives into said rotating fruit to make cuts surrounding said core material, removing said dicing knives together with the meat cut thereby, and simultaneously dicing the parallel cut material and separating said latter material from the core material.

6. The method of dicing fruit which comprises forcing dicing knives into the top and bottom of the fruit, rotating said knives to rotate said fruit on an axis of the core material, forcing parallel knives into said rotating fruit to make cuts surrounding said core material, removing said dicing knives together with the meat cut thereby, and passing a dicing and core separating knife through the parallel cut meat at right angles to the planes of said parallel cuts.

7. The method of dicing fruit comprising alining the fruit with reference to the stem end thereof, making a plurality of parallel circular cuts at a 90° angle to the major axis of the fruit passing through the stem end and the core, stopping said cuts in unwanted core material, and making a plurality of radial cuts through the circularly cut meat along a line parallel to said major axis, said radial cuts terminating short of the core material, and separating cut meat from core material.

8. The method of dicing fruit comprising alining the fruit with reference to the stem end thereof, making a plurality of parallel circular cuts at a 90° angle to the major axis of the fruit passing through the stem end and the core, stopping said cuts in unwanted core material, making a plurality of radial cuts through the circularly cut meat along a line parallel to said major axis, and simultaneously making a circular cut in the same direction to separate the core from diced material.

9. In a method of dicing fruit, the steps of engaging top and bottom of said fruit with dicing knives penetrating the fruit, and rotating said knives to rotate said fruit, cutting the top and bottom diced portions away from the remainder of the fruit during the rotation of said fruit, and removing the remainder of the fruit leaving the diced top and bottom portions in said dicing knives.

10. The method of dicing fruit comprising alining the fruit with reference to the stem end thereof, making a plurality of parallel circular cuts at a 90° angle to the major axis of the fruit passing through the stem end and the core, stopping said cuts in unwanted core material, and making a plurality of outwardly extending cuts through the circularly cut meat along a line parallel to said major axis, said outwardly extending cuts terminating short of the core material, and separating cut meat from core material.

11. The method of dicing fruit which comprises engaging top and bottom of said fruit with knives penetrating the fruit, rotating said knives to rotate said fruit around the major axis thereof, and forcing an additional knife into said fruit adjacent the cutting edges of both of said rotating knives to sever top and bottom of said fruit from the remainder thereof.

12. The method of dicing fruit which comprises engaging top and bottom of said fruit with knives penetrating unwanted core material, rotating said knives to rotate said fruit around the major axis thereof, forcing an additional knife into said fruit adjacent the cutting edges of both of said rotating knives to sever top and bottom of said fruit from the remainder thereof, removing the severed portions, and simultaneously removing the core from the remainder and dicing the coreless portion.

13. In a method of dicing fruit, the steps of simultaneously making a plurality of parallel circular cuts into the side of said fruit at a 90° angle to the major axis of said fruit passing through the stem end and core of the fruit, the outermost cuts extending at least to said axis to separate the ends of said fruit from the remainder, the inner cuts terminating short of said axis to provide annular slices joined by central material.

14. In a method of dicing fruit, the steps of simultaneously making a plurality of parallel circular cuts into the side of said fruit at a 90° angle to the major axis of said fruit passing through the stem end and core of the fruit, the outermost cuts extending at least to said axis to separate the ends of said fruit from the remainder, the inner cuts terminating short of said axis to provide annular slices joined by central material, and thereafter removing the central material by a cut intersecting the inner portions of said parallel cuts to separate the sliced material from the central material.

15. The method of dicing fruit having a substantially central stone which comprises forcing dicing knives into the top and bottom of the fruit to points short of engaging said stone, rotating said knives to rotate said fruit on the axis of said stone, forcing parallel knives into said rotating fruit to make cuts surrounding said stone, removing said dicing knives together with the end meat cut thereby, and removing said stone by a cut intersecting the inner portions of the cuts surrounding said stone.

16. The method of dicing fruit having a substantially central stone which comprises forcing dicing knives into the top and bottom of the fruit to points short of engaging said stone, rotating said knives to rotate said fruit on the axis of said stone, forcing parallel knives into said rotating fruit to make cuts surrounding said stone, removing said dicing knives together with the end meat cut thereby, simultaneously dicing the parallel cut material and separating the latter from said stone.

17. The method of dicing fruit having a substantially central stone which comprises forcing dicing knives into the top and bottom of the fruit to points short of engaging said stone, rotating said knives to rotate said fruit on the axis of said stone, forcing parallel knives into said rotating fruit to make cuts surrounding said stone, removing said dicing knives together with the end meat cut thereby, simultaneously dicing the parallel cut material and separating the latter from said stone, and mixing the diced end meat with the diced parallel cut meat.

ELLSWORTH W. CARROLL.
CHARLES LACHMAN.
PAUL WORMSER.